US009144951B2

(12) United States Patent
Schmidt et al.

(10) Patent No.: US 9,144,951 B2
(45) Date of Patent: Sep. 29, 2015

(54) PRESS

(75) Inventors: Ingo Schmidt, Schwarzenbek (DE); Werner Seifert, Wentorf (DE); Annett Janke, Zittow (DE)

(73) Assignee: Fette Compacting GmbH, Schwarzenbek (DE)

( * ) Notice: Subject to any disclaimer, the term of this patent is extended or adjusted under 35 U.S.C. 154(b) by 0 days.

(21) Appl. No.: 14/116,304

(22) PCT Filed: Apr. 19, 2012

(86) PCT No.: PCT/EP2012/001686

§ 371 (c)(1), (2), (4) Date: Feb. 10, 2014

(87) PCT Pub. No.: WO2012/152370

PCT Pub. Date: Nov. 15, 2012

(65) Prior Publication Data

US 2014/0199427 A1 Jul. 17, 2014

(30) Foreign Application Priority Data

May 10, 2011 (DE) ........................ 10 2011 101 293

(51) Int. Cl.

| | |
|---|---|
| ***B29C 43/08*** | (2006.01) |
| ***B30B 15/00*** | (2006.01) |
| ***B30B 11/00*** | (2006.01) |
| ***B30B 11/08*** | (2006.01) |
| ***B30B 15/30*** | (2006.01) |

(52) U.S. Cl.

CPC ............... *B30B 15/00* (2013.01); *B30B 11/005* (2013.01); *B30B 11/08* (2013.01); *B30B 15/302* (2013.01)

(58) Field of Classification Search

CPC ...... B30B 11/08; B30B 11/005; B30B 15/00; B30B 15/302

USPC .................. 425/135–173, 78, 344–345, 422; 700/206, 195

See application file for complete search history.

(56) References Cited

U.S. PATENT DOCUMENTS

| | | | | |
|---|---|---|---|---|
| 6,122,565 | A * | 9/2000 | Wenning et al. | 700/206 |
| 7,014,443 | B2 * | 3/2006 | Hinzpeter et al. | 425/167 |
| 7,125,234 | B2 * | 10/2006 | Scholz et al. | 425/167 |
| 7,379,783 | B2 | 5/2008 | Popp | |

(Continued)

FOREIGN PATENT DOCUMENTS

| | | |
|---|---|---|
| CN | 201 653 291 | 11/2010 |
| DE | 19920377 | 11/2000 |

(Continued)

*Primary Examiner* — Joseph S Del Sole
*Assistant Examiner* — Thu Khanh T Nguyen
(74) *Attorney, Agent, or Firm* — Vidas, Arrett & Steinkraus, P.A.

(57) ABSTRACT

The invention relates to a press, a rotary press in particular, comprising a press housing in which several operating components of the press are arranged, further comprising power-related components, which provide the operating components with electric energy for the operation, and comprising control components which exchange control- and/or measurement signals with the operating components and control signals with the power-related components, characterised in that the power-related components are arranged separately from the control components in a power element box which can be arranged at option on or within the press housing, or outside of the press housing and separately from the same.

5 Claims, 1 Drawing Sheet

(56) References Cited

U.S. PATENT DOCUMENTS

| | | | | |
|---|---|---|---|---|
| 7,379,784 | B2 | 5/2008 | Popp | |
| 7,392,107 | B2 | 6/2008 | Popp | |
| 7,713,469 | B2 * | 5/2010 | Schmidt et al. | 425/345 |
| 7,799,273 | B2 | 9/2010 | Popp | |
| 7,881,058 | B2 * | 2/2011 | Romer et al. | 425/345 |
| 8,002,537 | B2 * | 8/2011 | Seifert et al. | 425/345 |
| 8,660,680 | B2 | 2/2014 | Popp | |

FOREIGN PATENT DOCUMENTS

| | | | |
|---|---|---|---|
| DE | 10319022 | | 12/2004 |
| DE | 20 2005 011 876 | | 10/2005 |
| DE | 10 2007 034 359 | | 11/2008 |
| EP | 1602474 | | 12/2005 |
| JP | H08-071128 | A | 3/1996 |
| JP | 2001-269838 | A | 10/2001 |
| JP | 2003-220500 | A | 8/2003 |
| WO | 2009/026600 | | 3/2009 |

* cited by examiner

PRESS

CROSS-REFERENCE TO RELATED APPLICATIONS

This application is a U.S. National Stage Application which claims priority to PCT/EP2012/001686, filed Apr. 19, 2012, which claims priority to DE 10 2011 101 293.5 filed May 10, 2011, the entire contents of both of which are hereby incorporated by reference.

STATEMENT REGARDING FEDERALLY SPONSORED RESEARCH

Not applicable

BACKGROUND OF THE INVENTION

The present invention relates to a press, in particular to a rotary press, comprising a press housing in which several operating components of the press are arranged, further comprising power-related components, which provide the operating components with electric power for the operation, and comprising control components which exchange control- and/or measurement signals with the operating components, and control signals with the power-related components.

A rotary press is known for instance from DE 10 2007 034 359 B3. The control- and power-related components for controlling the operating components, for instance a rotational drive of the rotor of the press, and for the supply of the operating components with electric power, are arranged in a switch cabinet in the known press. The switch cabinet is integrated into a press housing. It is also known to arrange such switch cabinets at the outside of the press housing. Then, the switch cabinet is connected to the press via different control- and power lines. Due to their constructional concept, known presses have a fixed and given arrangement of the switch cabinet. The operator of a press must confine himself to the arrangement of the switch cabinet that is given by the constructional concept. If the switch cabinet is located within the press housing or is fixed on the same, no arrangement of the switch cabinet separately from the press housing is possible due to the constructional concept. However, if the switch cabinet is separated or located outside of the press housing in the constructional concept, no arrangement within or outside of the press housing is possible due to the constructional concept. Furthermore, a plurality of connection lines for the connection of the operating components with the control- and power-related components must be guided through the production room when the switch cabinets are arranged externally, which is often unwanted.

BRIEF SUMMARY OF THE INVENTION

Starting from the explained state of the art, the present invention is based on the task to provide a press of the kind mentioned in the beginning, wherein the flexibility with respect to the arrangement of the switch cabinet is increased and the number of lines that must be guided through the production room is decreased.

The present invention achieves this task through the subject matter of claim 1. Advantageous embodiments will be found in the dependent claims, the description and in the figures.

For a press of the kind mentioned in the beginning, the present invention achieves the task in that the power-related components are arranged separately from the control components in a discrete power element box, which can be arranged at option from out the outside on or within the press housing, or outside of the press housing and separately from the same.

The operating components of the press, which can be notably a rotary press, for instance a rotary tablet press, may be a matter of pressing punches, filling stations, dosage stations, pressing stations, ejector stations or measurement devices, for instance force measurement devices, optical measurement devices, temperature measurement devices etc. In case that that the press is a rotary press, a rotor of the rotary press may also be an operating component, which usually comprises a die table and guides for upper and lower punches. A rotary drive for the motor may also be an operating component.

The power-related components are notably components of the area of power electronics. It is a matter of supply components. They supply the operating components, for instance the rotary drive of a rotor, with electric power for the production operation. Examples for power-related components are power supplies, frequency converters, transformers and so on.

The control components trigger the operating components in the production operation of the press. The operating components can notably be the machine control system of the press or a safety control device of the press. They can also be a control- or measurement computer (PC). The control components may also receive measurement signals or similar data from the operating components. Thus, control components comprise also measurement signals in this context. Thus, a bidirectional signal transmission may take place. Based on such measurement signals, control and/or feedback control of the operating components of the press through the control components can take place in a per se known manner.

As for the signals exchanged between the control components and the operating components, which can be measurement- and control signals as explained above, long paths of the lines are unwanted. First, the signal quality is impaired. On the other hand, the lines for the transmission of the measurement- and control signals have frequently to be multi core, in contrast to the lines for the power supply. It is unwanted to guide these intricately designed lines outside of the press housing through the production room which accommodates the press. Furthermore, in such lines for control signals, each joint, for instance at the entrance into or the exit from a housing, is a risk for the signal transmission. Such joints are avoided in a high degree by the present invention in that the control components can be arranged near to the operating components.

In the course of making the present invention, it has been found that the power-related components, in contrast to the control components, can be connected to the operating components via long line paths without problems, without impairing the supply of power through this. Based on this, a spatial separation of the control components from the power-related components is provided according to the present invention. Through the separate arrangement of the power-related components in a power element box, the operator of the press has a high flexibility with respect to the arrangement of the power element box. For instance, the operator of the press can change the arrangement of this power element box in a flexible manner again, even after the already performed initial operation of the press, for instance in case that this is wanted due to changed spatial or production circumstances. The connection lines of the power element box for connecting the power-related components with the operating components on the one hand, and for connecting the power-related components with the control components on the other hand, notably in case that these are arranged in the press housing, and connection means between the power element box and the press housing provided if necessary are designed such that a flexible and optional change is possible between the arrangement of the power element box from out the outside on or within the press housing on the one hand, and outside of the press housing and separately from the same on the other hand.

Thus, a buyer of a certain press can freely decide whether the power element box with the power-related components is to be arranged internally, that is to say, inside of the press housing or on the latter, or whether the power element box is to be arranged externally, that is to say, outside of the press housing and separately from the latter. In particular, a subsequent change between an internal and an external arrangement of the power element box is also possible. Because the control components are spatially separated from the power-related components, the signal paths between the control components and the operating components remain always the same, independent from the arrangement and the configuration of the power element box. Through this, a constantly high signal quality of the control signals, the measurement signals in particular, is achieved, because defined line lengths are provided for all the signal lines of the control components at any time. Besides to this, the joints are avoided which are a problem with respect to the control signals in particular. The operating safety is increased and service and retrievability of errors is simplified. According to a particularly operating-safe embodiment, the control components can be arranged within the press housing. Then, still only those control lines must be guided out of the press housing which transmit control signals to the power-related components, in case that the latter are located in a power element box which is arranged outside of the press housing and separately from the same. The control components can be arranged in a control housing or a control switch cabinet, respectively.

According to a further embodiment, the power element box can comprise a power switch cabinet, in which the power-related components are arranged. For instance, the power switch cabinet can be arranged within the power element box. Such an arrangement is particularly suited for an external arrangement of the power-related components on a location remote from the press housing. For this purpose, the power switch cabinet can be connected to or be connectible to the operating components and the control components arranged in the press housing via a line connection that is guided into the press housing. A cooling installation for cooling the power-related components may also be provided. This can e.g. be provided in an interstice between the power element box and a switch cabinet arranged therein. Of course, it is also possible that the power element box of the present invention forms a power switch cabinet itself.

According to a further, particularly practical embodiment, a connection, a flange connection for instance, can be provided for fastening the power element box on or in the press housing from out the outside.

As already explained, the press may be a rotary press. The rotary press can comprise a rotor, normally rotatable around a vertical axis and having an upper and a lower punch guide and a die table between the punch guides. Furthermore, it can comprise a plurality of upper and lower pressing punches, the pressing punches co-operating with die bores of the die table. Further, the rotary press can comprise at least one filling station and at least one dosage station, in which material to be compacted is filled into the die bores and dosed. Finally, the rotary press can comprise at least one pressing station, in which the material filled into the die bores and dosed is compacted to compacted parts by the upper and lower pressing punches.

BRIEF DESCRIPTION OF THE SEVERAL VIEWS OF THE DRAWINGS

Examples of the realisation of the present invention are explained in more detail below by way of figures. They show very schematically.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
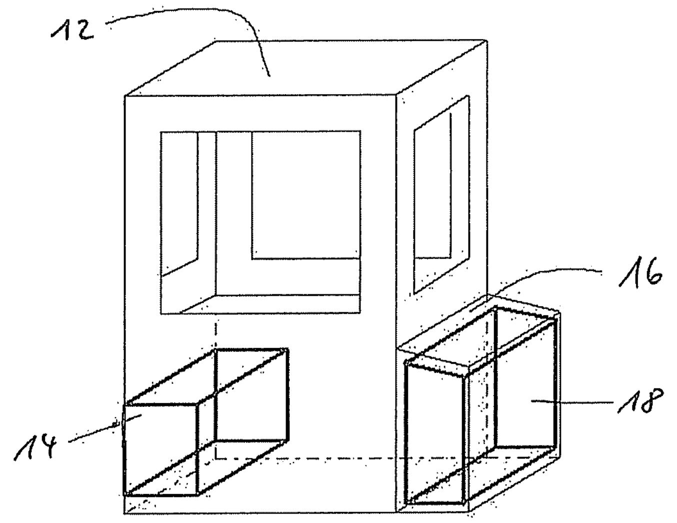
FIG. 1 a press of the present invention in a first aggregation variant.

Insofar as nothing else is indicated, same reference signs designate same objects in the figures. In FIG. 1, a press of the present invention in a first aggregation variant is depicted very schematically. The press is a rotary tablet press with a press housing 12. A plurality of operating components of the rotary tablet press is arranged in the press housing 12. In particular, a rotor is in the press housing, which is rotatable around a vertical axis by means of a rotary drive and has an upper and a lower punch guide and a die table between the punch guides, a plurality of upper and lower pressing punches being provided, the pressing punches co-operating with die bores of the die table, at least one filling station and at least one dosage station being provided further, in which the material to be compacted is filled into the die bores and dosed, and at least one pressing station being provided in which the material filled into the die bores and dosed is compacted to compacted parts by the upper and lower pressing punches. Further operating components of the rotary press arranged in the press housing 12 comprise measurement devices which record different operating parameters of the press by measurement techniques.

In order to control these operating components, control components are provided, in particular in the form of a machine control system. In the shown example, the control components are accommodated in a control switch cabinet 14 which is arranged within the press housing 12. The control components receive also measurement signals from the measurement devices. On this basis, amongst others, the control components trigger the operating components in the operation, and also power-related components of the press, which will still be mentioned below. On the basis of the measurement signals, feedback control of the operating components by the control components takes also place in the shown example.

Power-related components for the electric power supply of the operating components of the press are arranged in a power element box 16, spatially separated from the control components arranged in the control switch cabinet 14. In the shown example, the power-related components are located in a power switch cabinet 18, which is arranged within the power element box 16. In an interstice between the power element box 16 and the power switch cabinet 18, a cooling device for cooling the power switch cabinet 18 and the power-related components contained therein can be provided in particular. In the example shown in FIG. 1, the power element box 16 with the power switch cabinet 18 and the power-related components contained in the latter, is fastened from out the outside on an outer wall of the press housing 12. In the shown example, the fastening takes place by a flange connection not shown in more detail.

Figure 2:
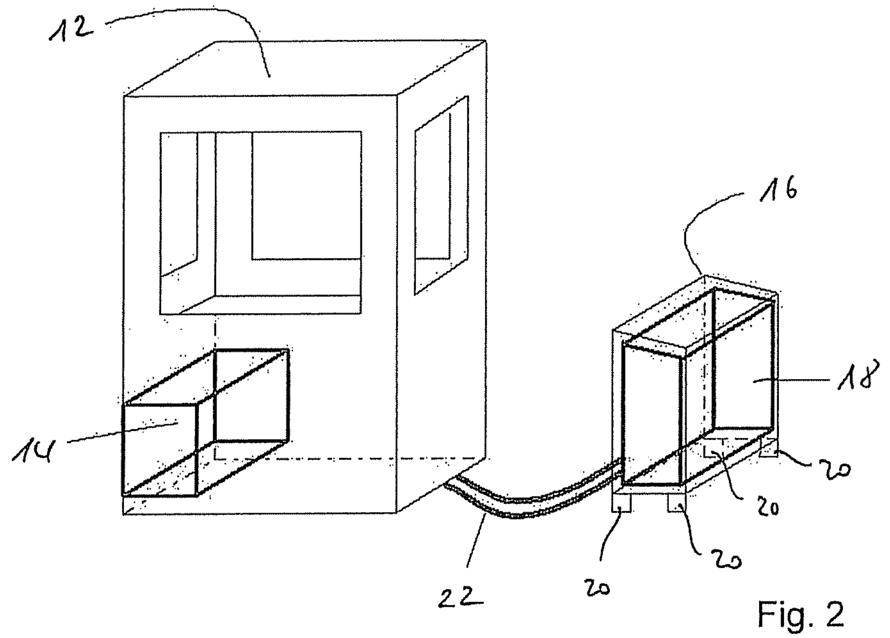
FIG. 2 the press of FIG. 1 in a second aggregation variant.

In FIG. 2, the press of FIG. 1 is shown in a second aggregation variant. The design of the press housing 12, inclusive the operating components arranged therein, and that of the control switch cabinet 14, as well as its arrangement, is identical to the aggregation variant shown in FIG. 1. However, in difference to FIG. 1, the power element box 16 with the power switch cabinet 18 is arranged outside of the press housing 12 and spatially separated from the same in the second aggregation variant shown in FIG. 2. One recognizes in FIG. 2 that the power element box 16 is set-up separately from the press housing 12 via pillars 20. A line connection 22 is provided, normally comprising a plurality of connection cables, which is connected at one side to the power element box 16 or the power switch cabinet 18 and the power-related components contained therein, respectively. On the other side, the line connection 22 is guided into the press housing 12, and connection cables of the line connection 22 are connected to the operating components, and other connection cables to the control components of the press in a manner not shown in detail. The design of the power element box 16 and the power switch cabinet 18, in particular of their basis and their fastening means, inclusive the line connection 22, is such that a change between the arrangements shown in FIG. 1 and FIG. 2 of the power element box 16 with the power-related components is possible in a flexible manner and also belatedly after a start-up of the press. In doing so, the control components remain always in their fixed position within the control switch cabinet 14, due to their arrangement separately from the power-related components. The same holds for sensitive signal processing lines between the control components and the operating components which guide control- and/or measurement signals.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A press comprising a press housing (12) in which several operating components of the press are arranged, further comprising power-related components, which provide the operating components with electric energy for the operation, and comprising control components which exchange control- and/or measurement signals with the operating components and control signals with the power-related components, characterised in that the power-related components are arranged separately from the control components in a power element box (16) which can be arranged at option on or within the press housing (12), or outside of the press housing (12) and separately from the same; wherein:

the control components are arranged within or on the press housing (12); and the control components are arranged within a control switch cabinet (14).

2. A press according to claim 1, characterised in that the power element box (16) comprises a power switch cabinet (18) which houses the power-related components.

3. The press according to claim 2, characterised in that the power switch cabinet (18) is adapted to be connected to the operating components and to the control components via a line connection (22) which is guided into the press housing (12).

4. A press according to claim 1, characterised in that a connection is provided for fixing the power element box (16) from out the outside on or within the press housing (12).

5. The press according to claim 1, wherein the press is a rotary press characterised in that it comprises a rotor with an upper and a lower punch guide, and with a die table between the punch guides, that it further comprises a plurality of upper and a plurality of lower pressing punches, wherein the pressing punches co-operate with die bores of the die table, that it further comprises at least one filling station and at least one dosage station, in which material to be compacted is filled and dosed into the die bores, and that it further comprises at least one pressing station wherein the material filled and dosed into the die bores is compacted to compacted parts by the upper and lower pressing punches.

* * * * *